UNITED STATES PATENT OFFICE.

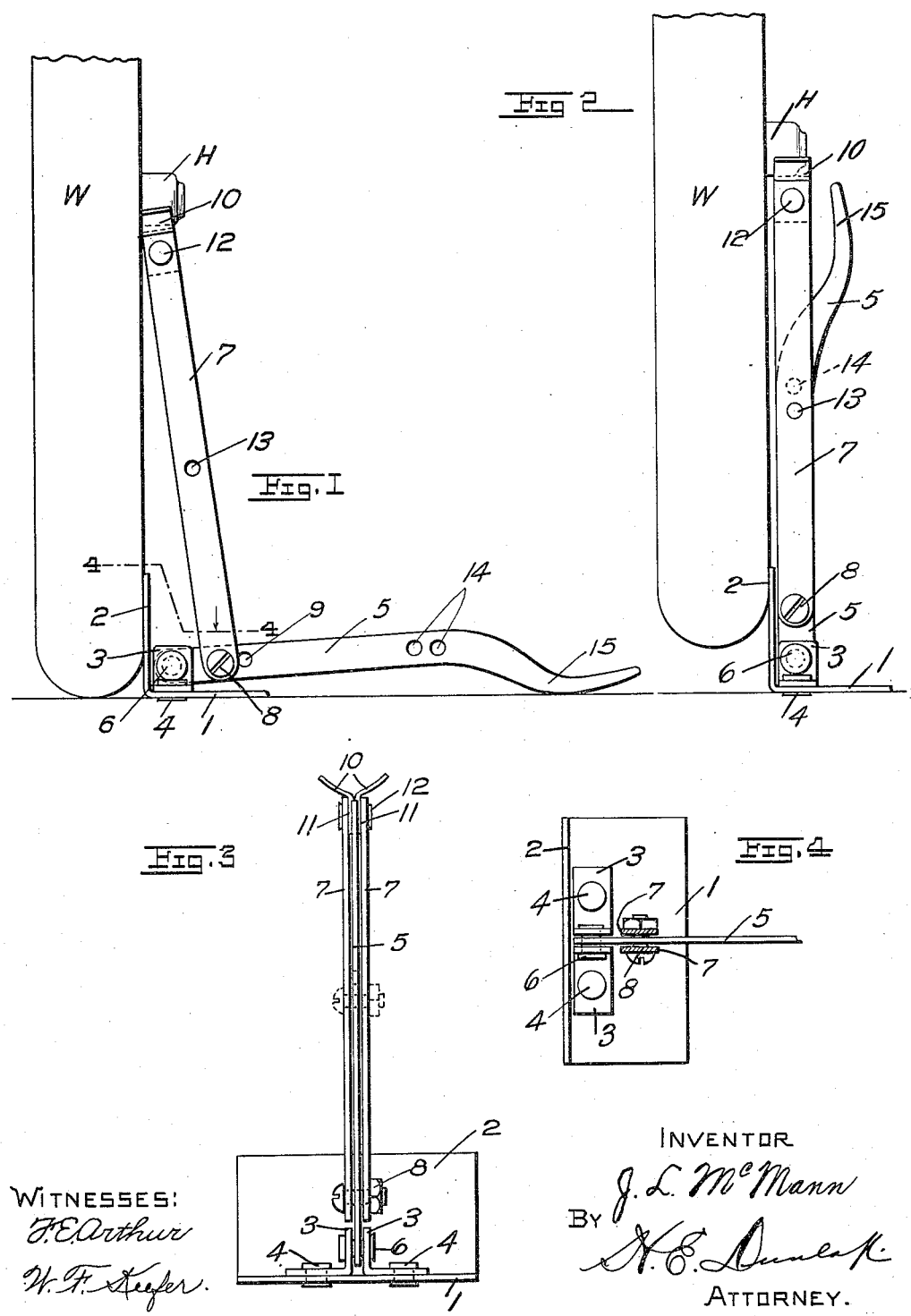

JAMES L. McMANN, OF STRUTHERS, OHIO.

AUTOMOBILE-JACK.

1,151,960.  Specification of Letters Patent.  Patented Aug. 31, 1915.

Application filed July 30, 1914. Serial No. 854,073.

*To all whom it may concern:*

Be it known that I, JAMES L. McMANN, a citizen of the United States of America, and resident of Struthers, county of Mahoning, and State of Ohio, have invented certain new and useful Improvements in Automobile-Jacks, of which the following is a specification.

This invention relates to certain new and useful improvements in automobile jacks and relates more particularly to a jack in which a hand operating lever is employed that effects raising of the car by an upward movement from a horizontal to a vertical position, as distinguished from jacks in which the operating lever is moved from a vertical position downwardly to a horizontal position to effect raising of the car.

The primary object of the invention is to provide an improved, simplified, and economical structure of jacks in which a minimum of parts and material are employed.

A further and important object of the invention is to provide a jack which is constructed so as to abut the wheel in order to prevent lateral movement of the car to an extent such as would cause the wheel to be disengaged from the jack.

Other and further objects will be later set forth in evidence in the following specification.

In the drawings: Figure 1 is a side elevation of the invention in position ready to raise the car; Fig. 2 is a similar view showing the car in raised position; Fig. 3 is a front elevation of the jack; and Fig. 4 is a section on the line 4—4 of Fig. 1.

In proceeding in accordance with the present invention I employ a base which has a horizontal surface engaging part or foot 1 and a right angular abutment 2 which projects upwardly from the part 1 and is adapted to engage a side of the wheel. A pair of angle or L-shaped brackets 3 are riveted to the horizontal part 1 at 4, and have their vertical portions arranged in spaced relation, and pivotally received in said space between the vertical portions of the brackets 3 is a hand operating lever 5, the latter being pivoted by means of bolts 6 to the brackets 3. It will be noted that the brackets 3 are arranged to the rear of the vertical part 2 so as to brace the latter, and in addition the part 2 as well as foot 1, acts to protect the brackets 3 as is evident. A pair of links 7 are pivoted at 8 in one of a series of holes 9 formed in lever 5, which links are arranged on opposite sides of the lever 5. The upper ends of the links are held in spaced relation by means of a sectional shoe, which has arc-shaped portions 10 that conjointly provide a seat for the hub H of the automobile wheel W the shoe sections having stems 11 secured by a bolt 12 in abutting relation and in the space between the upper or outer ends of the links 7. The links are provided with openings 13 and the lever 5 is provided with similar openings 14 which, when the jack is in raised position as shown in Fig. 2 enables a pin or any instrument not shown, to be passed between the registering openings 13 and 14 so as to hold the lever 5 locked in up or operative position. The lever 5 is formed with a hand gripping portion 15.

In operation, the base is first placed in the position shown in Fig. 1, in which the foot 1 rests on the ground and the vertical part 2 abuts the side of the wheel W, the lever 5 being in the horizontal position shown in Fig. 1, whereupon the shoe 10 is moved to engage below and with the hub H. The lever 5 is now raised from the horizontal position shown in Fig. 1, to the vertical position shown in Fig. 2, which effects raising of the wheel and at the same time brings the openings 13 and 14 into register, whereupon a pin may be passed through these registering openings to secure the lever 5 locked. Any tendency of the wheel W to move toward the jack will be counteracted by the presence of the vertical part 2 which acts as an abutment to prevent such movement of the wheel.

It is particularly to be noted that the present invention possesses the advantages of a simple and economical structure and one in which the parts are compactly assembled or related which is a desideratum in automobile jacks since but small storage space is required when the jack is to be stowed in the automobile.

What is claimed is:

1. In a jack, a base having a horizontal foot and a vertical abutment at one end of the foot, a pair of L-shaped brackets secured in spaced relation to the foot and to the rear of the abutment so as to brace the latter, a hand lever pivoted to said brackets in the space therebetween, a pair of links disposed on opposite sides of the lever at their lower ends and being pivoted thereto, and a sectional shoe having a stem on each section which stems are secured in abutting relation in the space between the upper ends of the links, said shoe sections having arc-shaped upper portions which conjointly form a seat for the wheel hub, and said links and lever having apertures which when the lever is in operative position register to allow a pin to be passed therethrough so as to lock the lever.

2. In a jack for automobiles, a base comprising a horizontal foot and a vertical abutment at one end of said foot, said abutment being designed to stand closely adjacent to an automobile wheel for preventing lateral shifting movement of the latter, a lever pivoted to the foot to the rear of the abutment, a shoe for engagement with the wheel hub, and a member interposed between said shoe and said lever and having pivotal connection with the latter whereby an elevating movement is imparted to the shoe when said lever is elevated.

3. In a jack, a foot, an abutment in fixed vertical relation to the inner end of said foot and adapted to engage a side of a wheel for preventing lateral shifting movement of the latter, a lever pivoted to the foot to the rear of the abutment, a shoe for engaging the wheel hub, and a link rigidly attached at one end to said shoe and pivotally connected at the other end to the lever at a point in the rear of the pivotal mounting of the latter.

4. In a jack, a base having a horizontal foot and a vertical abutment at one end of the foot, a pair of brackets secured in spaced relation to the foot and to the rear of the abutment, a hand lever pivoted to said brackets in the space therebetween, a pair of links disposed on opposite sides of the lever at their lower ends and being pivoted thereto, and a sectional shoe having a stem on each section which stems are secured in abutting relation in the space between the upper ends of the links, said shoe sections having arc-shaped upper portions which conjointly form a seat for the wheel hub, and said links and lever having apertures which when the lever is in operative position register to allow a pin to be passed therethrough so as to lock the lever.

In testimony whereof, I affix my signature in presence of two subscribing witnesses.

JAMES L. McMANN.

Witnesses:
JOHN SAUER,
WM. GARBETT.

Copies of this patent may be obtained for five cents each, by addressing the "Commissioner of Patents, Washington, D. C."